UNITED STATES PATENT OFFICE.

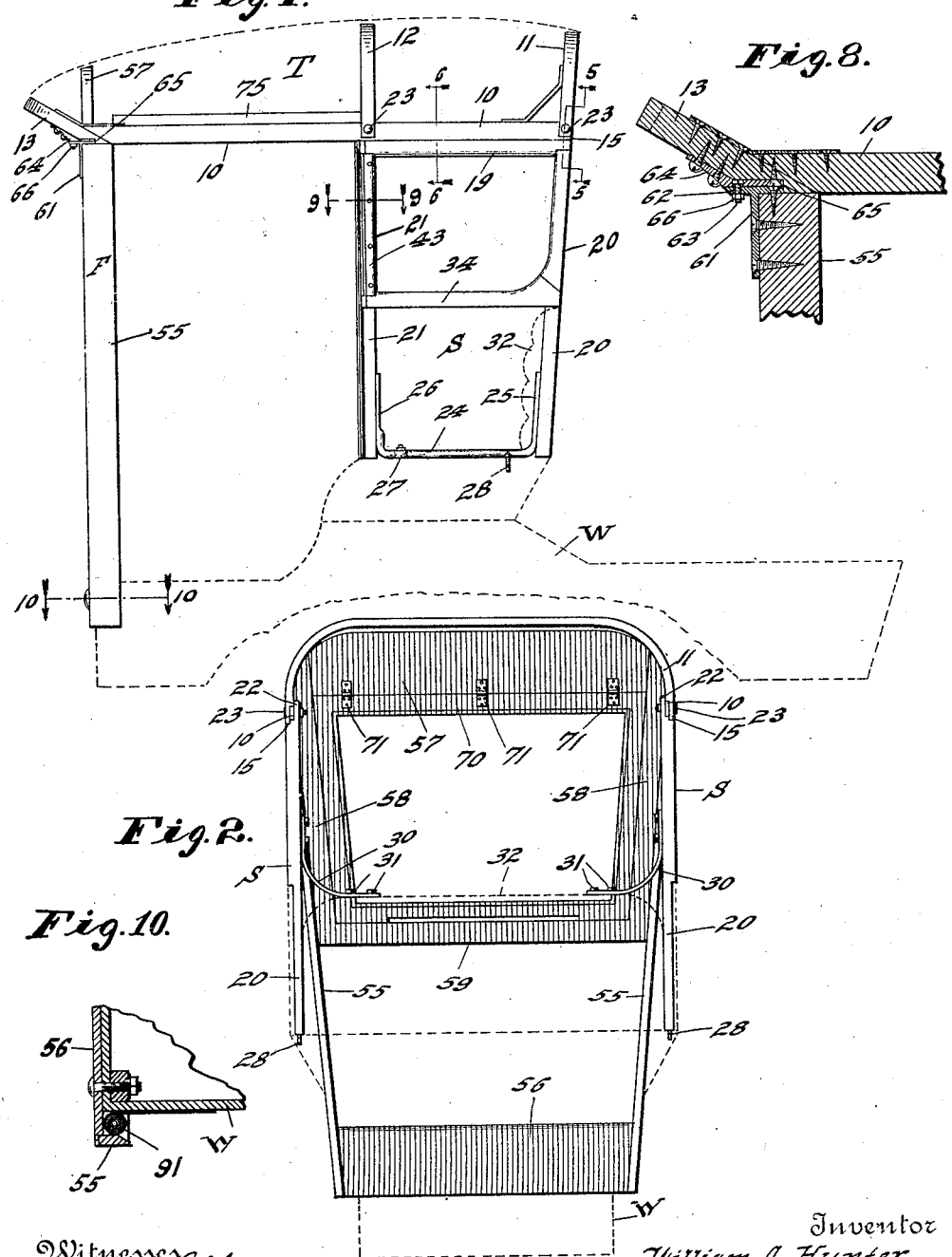

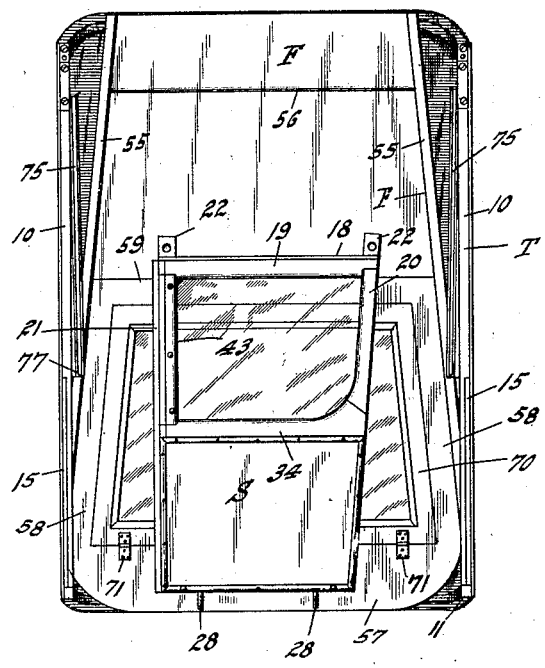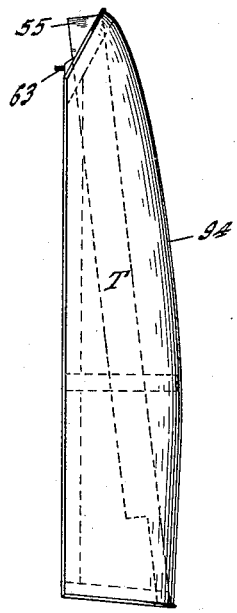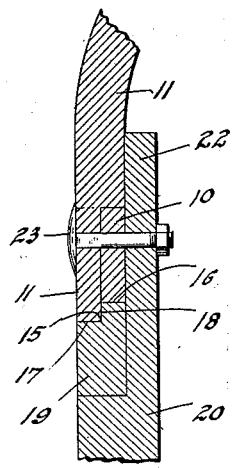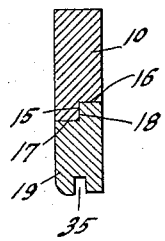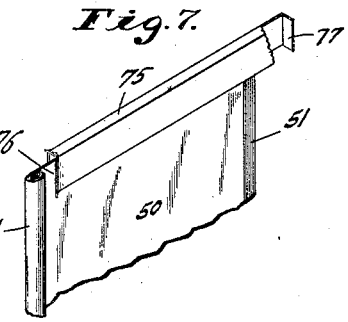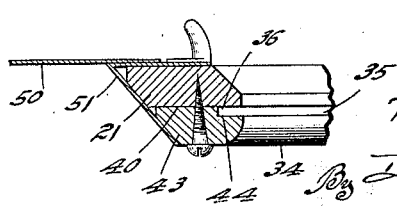

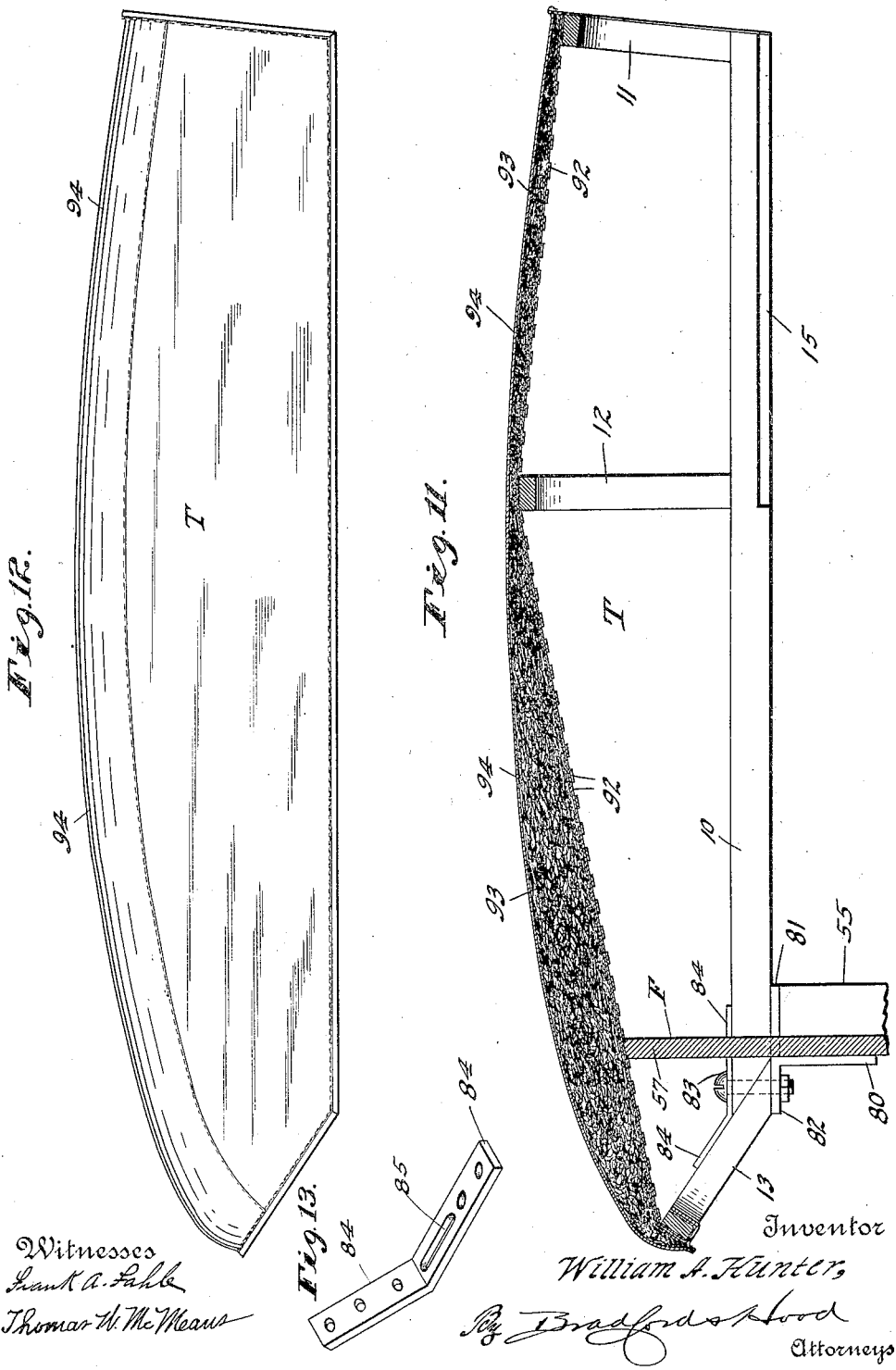

WILLIAM A. HUNTER, OF TERRE HAUTE, INDIANA.

REMOVABLE STORM-CAB FOR VEHICLES.

955,404.                Specification of Letters Patent.     Patented Apr. 19, 1910.

Application filed September 26, 1908. Serial No. 454,902.

*To all whom it may concern:*

Be it known that I, WILLIAM A. HUNTER, a citizen of the United States, residing at Terre Haute, in the county of Vigo and State of Indiana, have invented certain new and useful Improvements in Removable Storm-Cabs for Vehicles, of which the following is a specification.

I show in my Patent No. 810,151 a storm top for vehicles which can be readily withdrawn as an entity, from the body and seat of the vehicle. Such a structure must, of course, when assembled in position upon the vehicle, be storm proof and therefore heretofore has been constructed with its sides permanently secured to the top, thus producing a very bulky structure, which, when shipped, has to be heavily crated with considerable care and which occupies a very considerable space so that, while comparatively light, the structure is of such character that the freight charges are very considerable, in some cases, as for instance in the shipment from the Middle States to the Pacific coast the freight charges being a very large proportion of the ultimate cost to the user.

The object of my present invention is, therefore, to so construct the several portions of my improved top that they can be readily assembled and disassembled and, when disassembled, brought together in such compact form that a minimum amount of space will be occupied, thus permitting the securing of much lower freight rates than would be possible when the parts are constructed as shown in my above mentioned patent.

The accompanying drawings illustrate a skeleton or frame of the storm top constructed in accordance with my invention, the cover being purposely omitted for the sake of clearness.

Figure 1 is a side elevation with the parts in assembled position, the vehicle body and seat being shown in dotted lines; Fig. 2 a rear end elevation of the parts as shown in Fig. 1; Fig. 3 a plan of the complete parts disassembled and packed in shipping condition; Fig. 4 a side elevation of the parts shown in Fig. 3; Fig. 5 a section, on an enlarged scale, on line 5—5 of Fig. 1; Fig. 6 a section on line 6—6 of Fig. 1; Fig. 7 a detail of an improved receiver for the upper end of the sliding curtain to prevent entrance of wind; Fig. 8 a detail of one form of detachable connection between the upper corner of the front frame and the forward corner of the cover member; Fig. 9 a section on line 9—9 of Fig. 1; Fig. 10 a section in line 10—10 of Fig. 1; Fig. 11 a section of the top member, Fig. 12 a side elevation of the parts shown in Fig. 11; Fig. 13 a detail of strap 84.

In the drawings, T indicates the top member which, in the plan, is of a size sufficient to cover the seat and forward end of the vehicle body W. The top T comprises the side bars 10—10, the rear bow 11, the intermediate bow 12, and the forward bow 13 inclined forwardly and upwardly at the forward ends of the bars 10. In order to permit the ready attachment of the sides S, S, yet at the same time permit the establishment, when the parts are assembled, of a weatherproof joint, I form along the outer lower edge of each bar 10, at its rear end, a depending lip 15 which thus forms a recessed shoulder 16, the parts 15 and 16 being shaped so as to fit upon the correspondingly shaped portions 17 and 18 respectively of the upper edge of the top bar 19 of side S. The top bar 19 is, at its ends, secured to the rear upright 20 and the forward upright 21, said bars 20 and 21 having upwardly projecting ends 22 which overlap the side bars 10 of the top T, preferably in line with the two bows 11 and 12 respectively of the top T so that fastening bolts 23 may be readily passed through the parts, as clearly shown in Figs. 1 and 5, to firmly hold the parts together in a readily detachable manner.

In my preceding patent, above mentioned, the two depending sides at the rear of the structure were substantially permanently secured to a U-shaped metal shifting rail which was adapted to be detachably secured to the seat of the vehicle. Such a construction prevents the ready and compact packing of the structure and I have therefore discarded this form of shifting rail and have substituted therefor the construction now to be described. The lower ends of the uprights 20 and 21 are connected together by a metal rail 24 having substantially vertical upturned ends 25 and 26 which are firmly secured to the uprights 20 and 21 respectively and the rail 24 is provided with suitable fastening means, such for instance as an eye 27 or a threaded nib 28, adapted to coöperate with corresponding fastening members carried by the seat W, said fastenings being readily detachable in order to permit the easy detachment of the structure as a whole from the seat and body. With such a construction it is desirable to provide means to laterally stiffen the structure when in operative position on the seat and body and for that purpose I secure to the inner side of each rear upright 20 about midway thereof, one end of a brace rod 30 which is projected downwardly and inwardly so that its other end may be detachably secured, by screws or bolts 31, to the upper edge of the back 32 of the seat. It is desirable that the sides S comprise transparent portions and, in order to permit the ready replacement of the glass, and at the same time insure a storm proof mounting therefor I extend between the two uprights 20 and 21, at a point about midway their length, a cross bar 34. I form in the lower edge of bar 19, and in the forward edge of upright 20, and in the upper edge of the cross bar 34, a glass receiving groove 35 which groove is substantially the width of the thickness of the glass to be used and of a sufficient depth to permit the edges of the glass to enter therein to a considerable extent. The outer face of the upright 21, between the bars 19 and 34 is then chamfered down to the plane of the inner edge of the grooves 35 as at 40 (Fig. 9). Adapted to be detachably secured to the surface 40, by any suitable means such as screws, is a strip 43 provided at its inner corner with the rabbet 44 which, in conjunction with the inner edge of surface 40, forms a groove 36 corresponding with groove 35 of the other parts of the glass-receiving frame. All danger of water driving along the surface 40 into the interior of the storm-top is prevented because, in stormy weather, the side curtains 50 will be drawn rearward, in the manner described in my above mentioned patent, and the weather guard 51 thereof will lap over the forward edges of the upright 21 and strip 43 so as to cover completely the joint between said parts. By this arrangement it is possible to readily remove a broken glass and substitute a new one, yet the mounting of the glass is such as to prevent rain and sleet from driving into the interior of the structure.

It is desirable that the front F of the storm top be removable from the top T both for purposes of packing and also to permit the use of the other portion of the storm top in clear weather, and for this purpose the front F comprises two side bars 55, 55 which are connected at their lower ends by a plate 56 adapted to lie in front of the front panel of the vehicle body. The bars 55 are spread slightly at their upper ends and are connected to a front structure comprising the top plate 57, side bars 58 58 and the lower rail 59, the plate 57 extending upwardly, as shown in Fig. 1 to mate with the cover member which is secured to the bows 11, 12 and 13, as hereinafter described. The side members 55 at their upper ends stop at a point to mate with the lower edges of the side bars 10 of the top T and said members 55 carry at the upper forward corners a T-plate 61 the stem of which is secured to the forward edge of a bar 55. The head of plate 61 extends in one direction over the top of bar 55 and in the other direction extends forwardly and is provided with a vertical perforation 62 adapted to receive a bolt 63 carried by a plate 64 secured to the forward lower corner of the top T, in the particular form shown, the point of attachment being on bow 13, the parts being cut away to form a shoulder 65 which serves to properly position the parts relatively and the inner face of the bar 10 lying against the edge of the upper end of the adjacent side bars 58 of front F. Nut 66 on bolt 63 firmly clamps the parts together yet permits ready removal. The space between the parts 57, 58, 58 and 59 is closed by a glass-carrying frame 70 connected by hinges 71 at its upper edge to the lower edge of plate 57.

In practice I have found that there are slight variations in the lengths of different body-portions W between the seat and dashboard, yet it is essential that the side-bars 55 stand square with top bar 10 because the curtains are carried by said side-bars, and that some means should be provided by which a limited adjustment of the upper ends of bars 55 may be had relative to the top-bars 10. For that reason I have provided, instead of the construction shown in Fig. 8, the construction shown in Figs. 11 and 13. In that form I secure, to the upper end of each bar 55 a T-plate having a shank 80 and one arm 81 engaging the forward upper corner of bar 55. The other arm 82 of the T-plate is provided with a perforation through which a bolt 83 may be passed. The side-bars 10 and bow 13 of the top T are braced and connected by a strap 84 through which is formed a slot 85 having a width sufficient to permit the passage of the bolt 83. In assembling the parts for the first time upon the vehicle body upon which it is to be used, the front F is first secured in position at its lower end and then swung at its upper end until it stands square with top-bars 10. Then, using the holes in arms 82 as gages, suitable holes may be bored up through bars 10, coming into register with slots 85 so as to permit the rigid connection of the parts by means of the bolts 83.

It has heretofore been customary in the formation of vehicle tops to produce a vizor-like front by means of a pair of bows at the forward end of the frame, the vizor-like portion of the cover being separately attached, but, such a construction is apt to permit leakage at the joints thus formed.

In the production of my device I have found that I can produce a very light, yet handsome top member, having no seam at the vizor, in the following manner. As previously stated the frame of the top member is formed by the two side-bars 10, the rear bow 11, the intermediate bow 12, and the forward bow 13 which connects the forward end of bars 10 and inclines forwardly and upwardly. To stretch a cover directly over the bows 11, 12 and 13 would produce an unsightly effect and I therefore stretch crossed webbing 92 between the bows, lay on a suitable padding or filler 93, and then stretch the single cover-member 94 which is previously formed by permanently connecting together suitably proportioned and shaped pieces, thus forming a completed top of pleasing shape and no transverse tacked seams.

In actual practice I have found that there is a tendency, during high winds, for air to blow in past the upper edge and rear corner of the curtains 50 when they are drawn so as to close the space between the front edge of the side S and the side bar 55 of the front F, the said side bar 55 carrying the curtain roller 91. In order to avoid this difficulty, therefore, I mount upon the inner side of each bar 10, over the space between the upright 21 and bar 55, an inverted U-shaped channel plate 75 which, at its forward end, is flared at 76, in order to readily permit the introduction of the free edge of the curtain 50. This channel 75 is of considerable vertical extent so as to extend down on the curtain enough to insure against the curtain being blown inward by the wind enough to withdraw its upper edge from the channel and, in order to prevent the wind from blowing in through the channel, the rear end of this channel is closed by plate 77 (Fig. 7) against which the free upper corner of the curtain is drawn when the guard 51 is fitted around and secured to the upright 21 in the manner described in my above mentioned patent.

It will be noticed, from an examination of Figs. 3 and 4, that the structure when made in accordance with my present disclosure, may be packed into a very small space but that, when the parts are assembled, the parts are readily assembled by means of only six bolts (four bolts 23 and two bolts 63 or 83) for the purpose of storm protection the parts being readily detachable at any time without in any manner destroying the finish or connection between the coverings and the various frame members.

I claim as my invention:

1. A collapsible storm top for vehicles comprising a main cover member and a pair of depending side members detachably secured to the cover member at its rear corners, each of said depending sides comprising a pair of uprights connected at their lower ends by a rigid bar provided with means for detachable engagement with a vehicle and a brace member secured at one end to the inner face of each depending side and adapted to be secured at its opposite end to the seat of the vehicle.

2. A collapsible storm top for vehicles comprising a main cover member and a pair of depending side members detachably secured to the cover member at its rear corners, each of said depending sides comprising a pair of uprights connected at their lower ends by a rigid bar provided with means for detachable engagement with a vehicle and at its upper end having an overlapping storm proof connection with the cover member and a brace member secured at one end to the inner face of each depending side and adapted to be secured at its opposite end to the seat of the vehicle.

3. A collapsible storm top for vehicles comprising a main cover member T having side bars 10 and the bows 11, 12 and 13, detachable side members S each comprising a pair of uprights having the upper ends overlapping the side bars 10 and adapted to be detachably secured thereto by bolts, each of said depending sides having near its upper end a cross-bar formed at its upper edge to overlap and mate with the adjacent portion of the side bar 10 in a storm proof manner, and a depending front member extending across between the forward ends of the side bars 10 of the top T and provided near its upper corners with plates adapted to coöperate with and be clamped to the forward ends of said side bars 10, by means of a bolt passing upwardly therethrough and through a slotted plate carried upon the upper face of the side bar.

4. A collapsible storm top for vehicles comprising a main cover member T having side bars 10 and the bows 11, 12 and 13, detachable side members S each comprising a pair of uprights having the upper ends overlapping the side bars 10 and adapted to be detachably secured thereto substantially in alinement with the bows 11 and 12 by bolts, each of said depending sides having near its upper end a cross bar formed at its upper edge to overlap and mate with the adjacent portion of the side bar 10 in a storm proof manner, and a depending front member extending across between the forward ends of the side bars 10 of the top T and provided near its upper corners with plates adapted to coöperate with and be clamped to the forward ends of said side bars 10, by means of a bolt passing upwardly therethrough and through a slotted plate carried upon the upper face of the side bar.

5. A storm top for vehicles comprising side portions, a top adapted to be secured to said side portions and extending forwardly from same, a front portion provided with means at its lower end for attachment to a vehicle body and at its upper end with a perforated bolt-carrying member, and a slotted plate carried upon an upper face of an adjacent portion of the frame of the top member and having a slot registering with the bolt perforation of the bolt-carrying member of the front, and a bolt adapted to pass through said slot and perforation to clamp the parts together, substantially as and for the purpose set forth.

In witness whereof, I, have hereunto set my hand and seal at Indianapolis, Indiana, this twenty-second day of September, A. D. one thousand nine hundred and eight.

WILLIAM A. HUNTER. [L. S.]

Witnesses:
ARTHUR M. HOOD,
THOMAS W. MCMEANS.